United States Patent
Lee (10) Patent No.: US 9,147,389 B2
(45) Date of Patent: Sep. 29, 2015

(54) APPARATUS FOR CONTROLLING NOISE OF VEHICLE BODY

(71) Applicant: Hyundai Motor Company, Seoul (KR)

(72) Inventor: Tae Hoon Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 111 days.

(21) Appl. No.: 14/099,780

(22) Filed: Dec. 6, 2013

(65) Prior Publication Data

US 2015/0066235 A1  Mar. 5, 2015

(30) Foreign Application Priority Data

Sep. 5, 2013  (KR) .................. 10-2013-0106860

(51) Int. Cl.
*G06F 7/00* (2006.01)
*G10K 11/16* (2006.01)
*F16F 15/00* (2006.01)

(52) U.S. Cl.
CPC .............. *G10K 11/16* (2013.01); *F16F 15/002* (2013.01)

(58) Field of Classification Search
CPC ........ G01K 11/16; B62D 21/11; B62D 21/00; F01N 1/00; G10G 11/16; F16F 15/002
USPC ......... 701/1, 36; 280/5.5; 180/377, 379, 89.1; 381/71.4, 86; 188/267.2, 266.1
See application file for complete search history.

(56) References Cited

U.S. PATENT DOCUMENTS

| | | | |
|---|---|---|---|
| 6,416,102 B1* | 7/2002 | Howard | 296/35.1 |
| 2004/0086134 A1* | 5/2004 | Matsuoka et al. | 381/71.4 |
| 2004/0195028 A1* | 10/2004 | Izumi | 180/249 |
| 2004/0206569 A1* | 10/2004 | Kodama et al. | 180/402 |

(Continued)

FOREIGN PATENT DOCUMENTS

| JP | 2009-220731 A | 10/2009 |
|---|---|---|
| JP | 2011-017303 A | 1/2011 |

(Continued)

OTHER PUBLICATIONS

Shin Hur et al., The Study of Static and Dynamic Characterisics for TM Rubber Mount, Department of Structural Safety, Department of Mechanical Engineering, Mingook University, pp. 1243-1248, Seoul, Republic of Korea.

*Primary Examiner* — Helal A Algahaim
*Assistant Examiner* — Shardul Patel
(74) *Attorney, Agent, or Firm* — Morgan, Lewis & Bockius LLP (57) ABSTRACT

An apparatus for controlling noise of a vehicle body may include a reinforcement member movably installed in a vehicle body frame, an accelerator pedal detection unit for detecting whether an accelerator pedal is operated, a controller for determining whether a vehicle accelerates or decelerates based on a signal from the accelerator pedal detection unit and outputting a control signal to move the reinforcement member to be in contact with or to be spaced apart from a cross member of the vehicle body frame in accord with acceleration or deceleration of the vehicle, and a driving apparatus for moving the reinforcement member according to the control signal of the controller. By selective movement of the reinforcement member, the apparatus modifies a noise generated by the cross member differently according to the acceleration or the deceleration of the vehicle and thus improves sound quality.

9 Claims, 6 Drawing Sheets

(56) References Cited

U.S. PATENT DOCUMENTS

| | | | |
|---|---|---|---|
| 2007/0108867 A1* | 5/2007 | Saloka et al. | 310/311 |
| 2010/0244341 A1* | 9/2010 | Nemoto | 267/140.14 |
| 2011/0272229 A1* | 11/2011 | Kobayashi et al. | 188/379 |
| 2013/0092694 A1* | 4/2013 | Green | 220/562 |
| 2014/0182959 A1* | 7/2014 | Stebbins et al. | 180/89.1 |

FOREIGN PATENT DOCUMENTS

| | | |
|---|---|---|
| KR | 10-2007-0063947 A | 6/2007 |
| KR | 10-2012-0121439 A | 11/2012 |

* cited by examiner

FIG. 1

(A-A Sectional view)

APPARATUS FOR CONTROLLING NOISE OF VEHICLE BODY

CROSS-REFERENCE TO RELATED APPLICATION

The present application claims priority of Korean Patent Application Number 10-2013-0106860 filed Sep. 5, 2013, the entire contents of which application are incorporated herein for all purposes by this reference.

BACKGROUND OF INVENTION

1. Field of Invention

The present invention relates to an apparatus for controlling noise of a vehicle body, and more particularly, to an apparatus for controlling noise of a vehicle body which can differently tune sound quality of noise of a vehicle body, which is generated during driving of a vehicle, according to acceleration and deceleration of a vehicle.

2. Background Art

In general, the structure of a vehicle body includes side frames disposed along opposite sides of a vehicle, and several cross members for transversely connecting the side frames to each other. There is one cross member installed in the vehicle body to support a transmission among the several cross members. This is called a transmission mounting cross member. Further, opposite ends of the transmission mounting cross member are fixed to the side frames.

Figure 1:
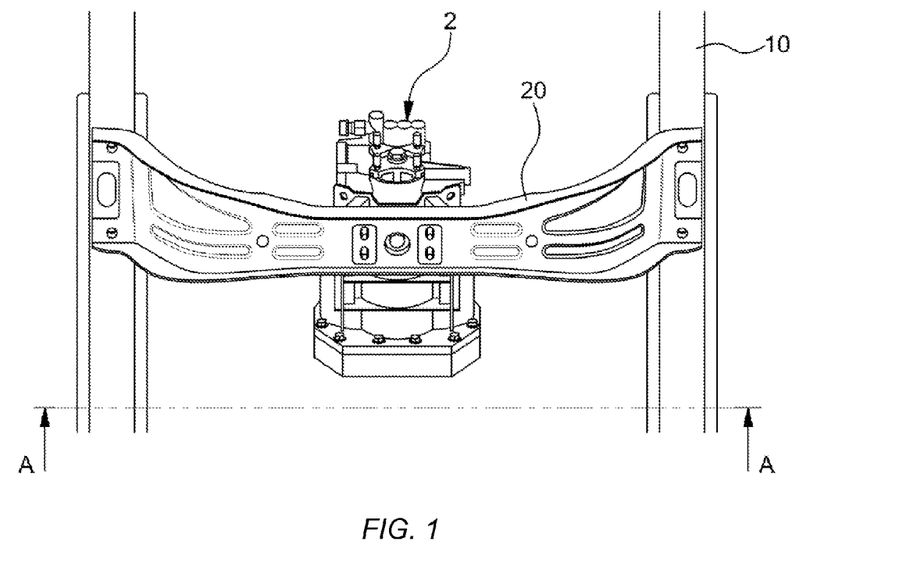
FIG. 1 is a bottom view showing a state of mounting a transmission to a cross member.

FIG. 1 is a bottom view showing a state of mounting a transmission to a cross member. As shown in FIG. 1, the transmission mounting cross member (hereinafter, referred to as 'cross member') 20 is installed to transversely connect the side frames 10 at opposite lower sides of a vehicle to each other, and the transmission 2 is supported by the cross member 20.

In this case, a mounting unit is installed at an upper side of the cross member 20 and the transmission 2 is mounted to the mounting unit, so that the mounting unit connects the transmission 2 to the cross member 20. In addition, a bush for preventing vibration, which is generated from the transmission and is transferred to the vehicle body, is conventionally mounted between the mounting unit and the transmission.

Meanwhile, noise is generated during driving of a vehicle while the vehicle body including the cross member is vibrating. Thus, the noise is input into a driver seat to cause a driver to feel uncomfortable.

Therefore, a technology for reducing noise of a vehicle body has been required, and noise generated due to the cross member may be reduced by reinforcing strength of the cross member.

Figure 2:
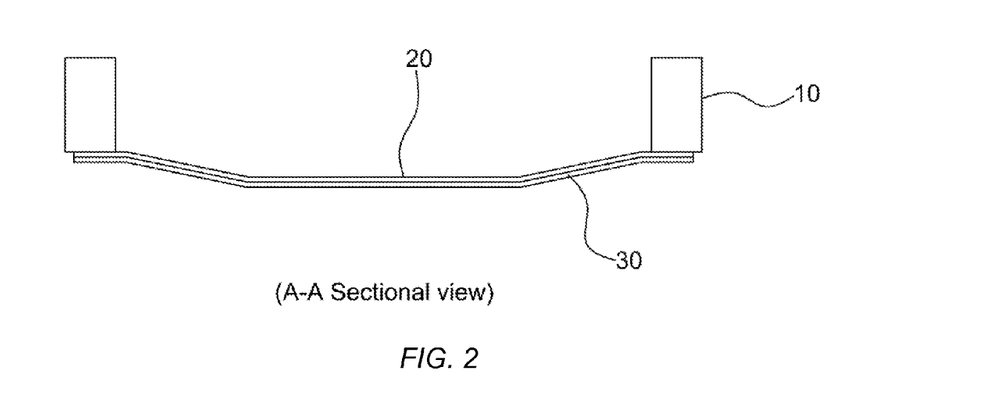
FIG. 2 is a sectional view showing a state of installing a reinforcement member to increase the strength of the cross member according to the related art.

Thus, a reinforcement member is installed to increase the strength of the cross member for the purpose of reducing the noise. FIG. 2 is a sectional view showing a state of installing a reinforcement member. As shown in FIG. 2, the reinforcement member 30 as well as the cross member 20 is installed to connect a left side and a right side of side frames to each other. When the reinforcement member 30 is installed, noise may be reduced by using a vibration characteristic of the cross member 20.

If the strength of the cross member is not reinforced, rumble noise (noise such as "doo doo doo" or "vroom") is generated so that the driver may be made to feel uncomfortable. However, if the strength of the cross member is reinforced by installing the reinforcement member, the noise generated due to the cross member may be reduced.

However, in the case of a technology of simply installing the reinforcement member, when taking into consideration that there exists a difference in the driver-preferable sound qualities of the sounds generated from vehicles, it is difficult to meet a sound characteristic that satisfies the drivers in a certain area.

For example, regarding European-preferable sound characteristic, European-preferable sound characteristic during an acceleration period is different from that during a deceleration period. A silent sound quality is required during the deceleration and a dynamic sound quality is required during the acceleration.

That is, the rumble noise generated when the strength of the cross member is not reinforced may become European-preferable dynamic noise during the acceleration. However, European prefers the silent sound quality which minimizes the noise generation, during the deceleration.

Therefore, it is necessary to specialize the sound characteristic according to areas by considering differences in a driving characteristic, a road condition, and a driver taste. In particular, a sound control technology, which can implement a dynamic sound quality during the acceleration of the vehicle and a silent sound quality during the deceleration of the vehicle according to European-preferable sound characteristic, is required.

When the reinforcement member is not installed, the rumble noise generated during the acceleration may become European-preferable dynamic noise. However, the noise due to the cross member is generated even during the deceleration, so that a driver feels uncomfortable.

In addition, when the reinforcement member 30 is installed as shown in FIG. 2, since the noise is fully removed regardless of the acceleration and deceleration of a vehicle as the strength of the cross member 20 is increased, the driver-preferable sound quality is not satisfied (it is impossible to implement the dynamic noise during the acceleration and the noise is too silent in both cases of acceleration and deceleration due to the installation of the reinforcement member).

Thus, there is a need to provide a technology capable of differently tuning the sound quality according to the acceleration and deceleration of a vehicle by using the cross member.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to solve at least some of the above-described problems associated with prior art.

Various aspects of the present invention provide for an apparatus for controlling noise of a vehicle body, which can differently tune sound quality of noise of a vehicle body, which is generated during driving of a vehicle, according to the acceleration and deceleration of a vehicle.

Various aspects of the present invention provide for an apparatus for controlling noise of a vehicle body, which can differently control sound quality of the noise generated due to a transmission mounting cross member according to the acceleration and deceleration of a vehicle.

In accordance with various aspects of the present invention, there is provided an apparatus for controlling noise of a vehicle body, the apparatus including: a reinforcement member movably installed in a vehicle body frame; an accelerator pedal detection unit for detecting whether an accelerator pedal is operated; a controller for determining whether a vehicle accelerates or decelerates based on a signal from the accelerator pedal detection unit and outputting a control signal to move the reinforcement member to be in contact with or to be spaced apart from a cross member of the vehicle body frame in accord with acceleration or deceleration of the vehicle; and a driving apparatus for moving the reinforcement member according to the control signal of the controller, wherein a noise generated by the cross member is modified differently according to the acceleration or the deceleration of the vehicle by selective movement of the reinforcement member, thereby improving sound quality.

The apparatus further includes a pad installed in the reinforcement member. The reinforcement member is in contact with the cross member through the pad. The controller outputs a control signal for allowing the reinforcement member to be in contact with the cross member when the vehicle decelerates, and outputs a control signal for allowing the reinforcement member to be spaced apart from the cross member when the vehicle accelerates.

The apparatus further includes: a vehicle speed detection unit for detecting a vehicle speed, wherein the controller outputs a control signal based on signals from the vehicle speed detection unit and the accelerator pedal detection unit, wherein the controller outputs the control signal for allowing the reinforcement member to be spaced apart from the cross member when the accelerator pedal is operated in a state where the vehicle is driven such that a vehicle speed exists, and outputs a control signal for allowing the reinforcement member to be in contact with the cross member when the accelerator pedal is released in a state where the vehicle is driven such that a vehicle speed exists.

The vehicle body frame includes side frames disposed at opposite sides of the vehicle body, wherein the cross member connects the side frames at the opposite sides of the vehicle body to support a transmission. The reinforcement member is transversely disposed between the side frames at the opposite sides of the vehicle body under the cross member.

The driving apparatus includes an actuator for moving the reinforcement member according to the control signal of the controller, and opposite ends of the reinforcement member are supported in the vehicle body frame by the actuator.

The actuator is a cylinder mechanism which supports each end of the reinforcement member, and of which a cylinder body is fixed to a bracket mounted to the vehicle body frame and a piston rod moving forward and backward is hinge-coupled to each end of the reinforcement member so that the reinforcement member is moved as the piston rod moves forward or backward.

The cylinder mechanism is a hydraulic cylinder mechanism, and the driving apparatus further includes a hydraulic pump driven by a transferred engine power to supply an operation hydraulic pressure to the hydraulic cylinder mechanism and a hydraulic valve for controlling the hydraulic pressure supplied to the hydraulic cylinder mechanism such that the reinforcement member is moved according to the control signal of the controller.

In accordance with the apparatus for controlling noise of a vehicle body of the present invention, since the sound quality of vehicle body noise generated during driving of a vehicle is differently tuned (changed) according to acceleration and deceleration of a vehicle, sounds specialized according to areas can be realized.

In particular, it is possible to satisfy European-preferable sound characteristic, that is, a driver request characteristic in which a dynamic sound is preferred during acceleration of a vehicle and a silent sound is preferred during the deceleration of a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
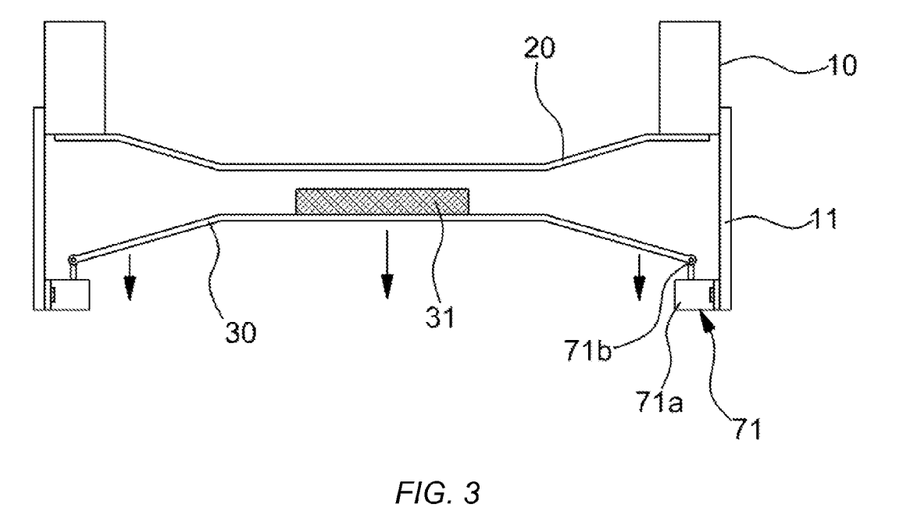
FIG. 3 shows a state of installing a reinforcement member and an actuator of an exemplary driving apparatus according to the present invention.
Figure 4:
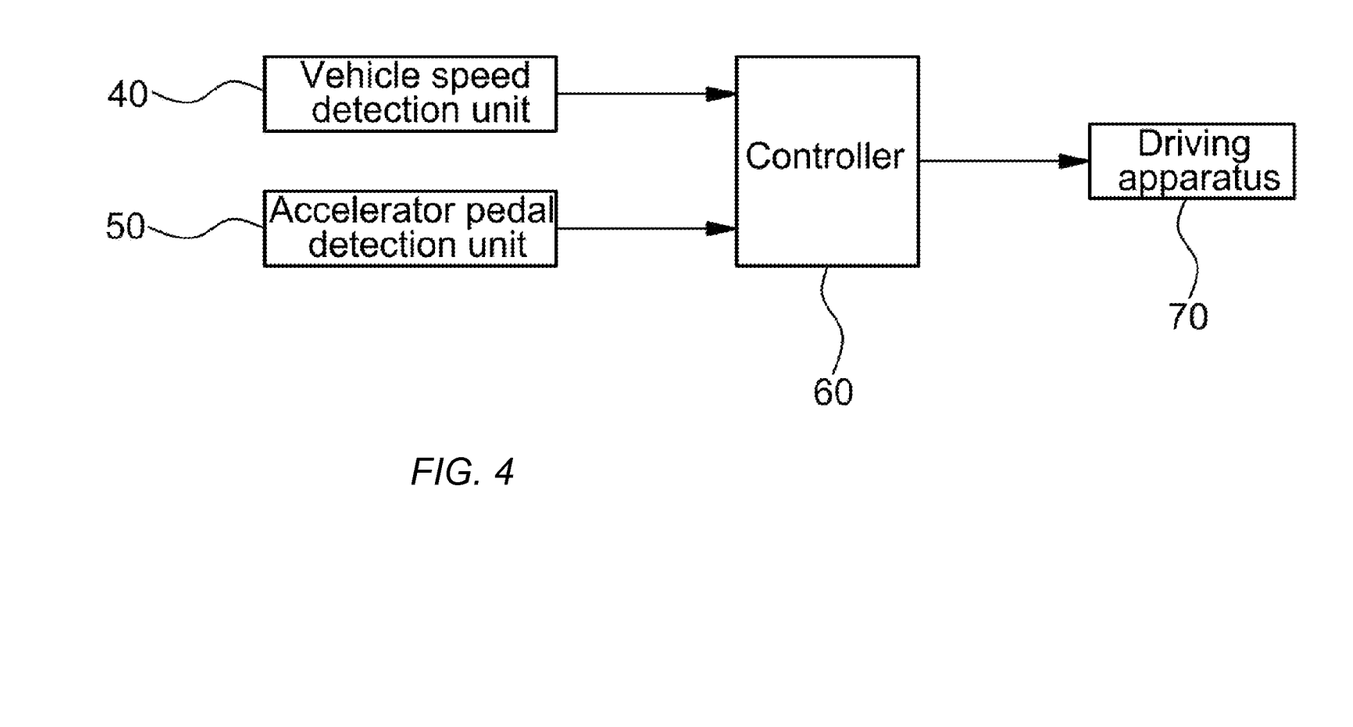
FIG. 4 is a block diagram showing a configuration of an exemplary apparatus for controlling an operation of a driving apparatus based on acceleration or deceleration of a vehicle according to the present invention.
Figure 5:
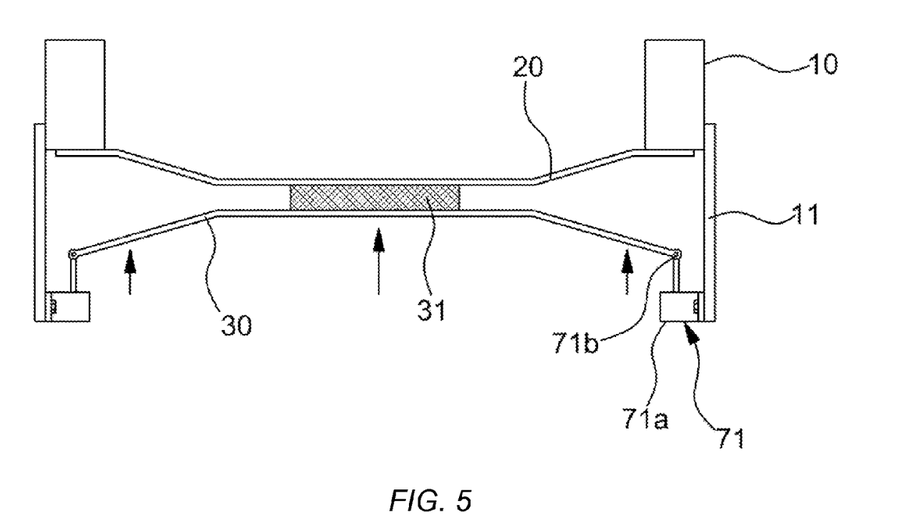
FIG. 5 shows an operation state of an exemplary apparatus for controlling noise during deceleration of a vehicle according to the present invention.

FIG. 3 shows a state of installing a reinforcement member 30 and an actuator 71 of a driving apparatus 70 according to various embodiments of the present invention. FIG. 4 is a block diagram showing a configuration of an apparatus for controlling an operation of the driving apparatus 70 according to acceleration and deceleration of a vehicle. FIG. 5 shows an operation state of a reinforcement member 30 and an actuator 71 for controlling noise during deceleration of a vehicle according to various embodiments of the present invention.

As shown, an apparatus for controlling noise according to the present invention includes the reinforcement member 30 to which a pad 31 is mounted, a driving apparatus 70, a vehicle speed detection unit 40, an accelerator pedal detection unit 50, and a controller 60.

The reinforcement member 30 is a member installed to support a vehicle body frame to be raised and lowered according to an operation of the driving apparatus 70. The reinforcement member 30 may be installed to be supported by a bracket 11 installed in the vehicle body frame, that is, each of left and right side frames 10, in which a transmission mounting cross member 20 (hereinafter, referred to as 'cross member') is installed. In this case, the reinforcement member 30 is installed below the cross member 20 to be disposed between the left and right side frames 10. Opposite ends of the reinforcement member 30 is supported by the bracket 11 installed to the side frames 10.

In addition, the upper and lower positions of the reinforcement member 30 are controlled by the driving apparatus 70 under the cross member 20. To this end, left and right ends of the reinforcement member 30 are movably supported in a state where the left and right ends of the reinforcement member 30 are coupled to the actuator 71 of the driving apparatus 70 fixedly installed in the bracket 11.

In the state where the reinforcement member 30 is raised by the actuator 71 of the driving apparatus 70, the reinforcement member 30 has a pad 31 which is in contact with the cross member 20. The pad 31 made of a rubber material may be fixed to a central upper portion of the reinforcement member 30.

In various embodiments, when the reinforcement member 30 is raised by the driving apparatus 70, while the pad 31 is in contact with the cross member 20, the vibration of the cross member is held or reduced. Thus, the reinforcement member prevents noise due to the vibration of the cross member from being generated or allows the sound quality of noise to be changed differently before the contact. To the contrary, if the reinforcement member 30 is lowered by the driving apparatus 70, since the pad 31 and the reinforcement member 30 are spaced apart from the cross member 20, noise may be generated.

The driving apparatus 70 is operated according to a control signal output from the controller 60 to raise or lower the reinforcement member 30 disposed at a lower side of the cross member 20. The driving apparatus 70 includes the actuator 71 which is installed between opposite ends of the reinforcement member 30 and left and right brackets 11 to move the reinforcement member while supporting the reinforcement member.

The actuator 71 may be a cylinder mechanism in which a piston rod 71b is operated to be moved forward and backward in a cylinder body 71a. A hydraulic pressure cylinder mechanism, in which the forward and backward operation of the piston rod 71b is performed by controlling an operation hydraulic pressure according to the control signal of the controller 60, may be used as the actuator 71.

In this case, each of cylinder mechanisms 71 is mounted by fixing the cylinder body 71a to the bracket 11. A fore-end of the piston rod 71b is hinge-coupled to each end of the reinforcement member 30.

If the cylinder mechanism 71 of the driving apparatus 70 is operated according to the control signal of the controller 60, the reinforcement member 30 may be raised or lowered by the forward and backward operation of the piston rod 71b, so the position of the reinforcement member 30 may be controlled according to the operation direction of the piston rod 71b.

Meanwhile, the vehicle speed detection unit 40 may be a conventional vehicle speed sensor which detects a vehicle speed during driving of a vehicle, transfers a signal according to the vehicle speed to the controller 60, and is installed in a vehicle. Further, the acceleration pedal detection unit 50 may be a conventional Acceleration Position Sensor (APS) which detects whether the vehicle accelerates or decelerates, that is, whether the acceleration pedal is operated, transfers a signal according to the vehicle acceleration or deceleration to the controller 60, and is installed in a vehicle.

As a driver of a conventional vehicle operates the acceleration pedal, the voltage signal output from the acceleration pedal sensor is converted into a sensor value ('APA value' or 'acceleration pedal open degree') in units of percentage (%) by the controller. Thus, it may be determined that the acceleration pedal is in an off-state (acceleration pedal is released) if the sensor value is 0%, and the acceleration pedal is in an on-state (acceleration pedal is operated) if the sensor value exceeds 0%.

The controller 60 essentially determines whether the vehicle is in the accelerating state or decelerating state by the operation of the driver based on the signal of the accelerator pedal detection unit 50 in order to control the operation of the driving apparatus 70. When the vehicle accelerates, the controller 60 allows the reinforcement member 30 to be lowered to be spaced apart from the cross member 20. When the vehicle decelerates, the controller 60 allows the reinforcement member 30 to be raised to be in contact with the cross member 20 through the pad 31.

That is, the controller 60 determines whether the vehicle accelerates or decelerates in order to output the control signal for driving the reinforcement member 30 upward and downward. When the vehicle accelerates, the driving apparatus 70 allows the reinforcement member 30 to be lowered (be spaced apart from the cross member) according to the control signal of the controller so that the dynamic noise may be generated due to the noise characteristic of the cross member 20. When the vehicle decelerates, the driving apparatus 70 allows the reinforcement member 30 to be raised (be in contact with the cross member through the pad) so that the noise due to the cross member 20 may be reduced or prevented from being generated.

FIGS. 3 and 5 show a state where the position of the reinforcement member 30 is controlled according to the operation state of the actuator 71 (the cylinder mechanism). As shown in FIG. 3, the reinforcement member is controlled to be placed at a low side during the acceleration. As shown in FIG. 5, the reinforcement member is controlled to be placed at an upper side during the deceleration.

Thus, when the vehicle accelerates by operating the accelerator pedal, the driver can drive the vehicle while taking feel of the dynamic sound generated due to the noise characteristic of the cross member in the state where the reinforcement member 30 is separated from the cross member 20 (taking sensitive feel of the engine power). To the contrary, when the vehicle decelerates by releasing the state of pressing the accelerator pedal, since the reinforcement member 30 is raised so that the vibration and the noise due to the cross member 20 are reduced, the vehicle is driven in a silent state or a noise-reduction state as the engine power is reduced.

Figure 6:
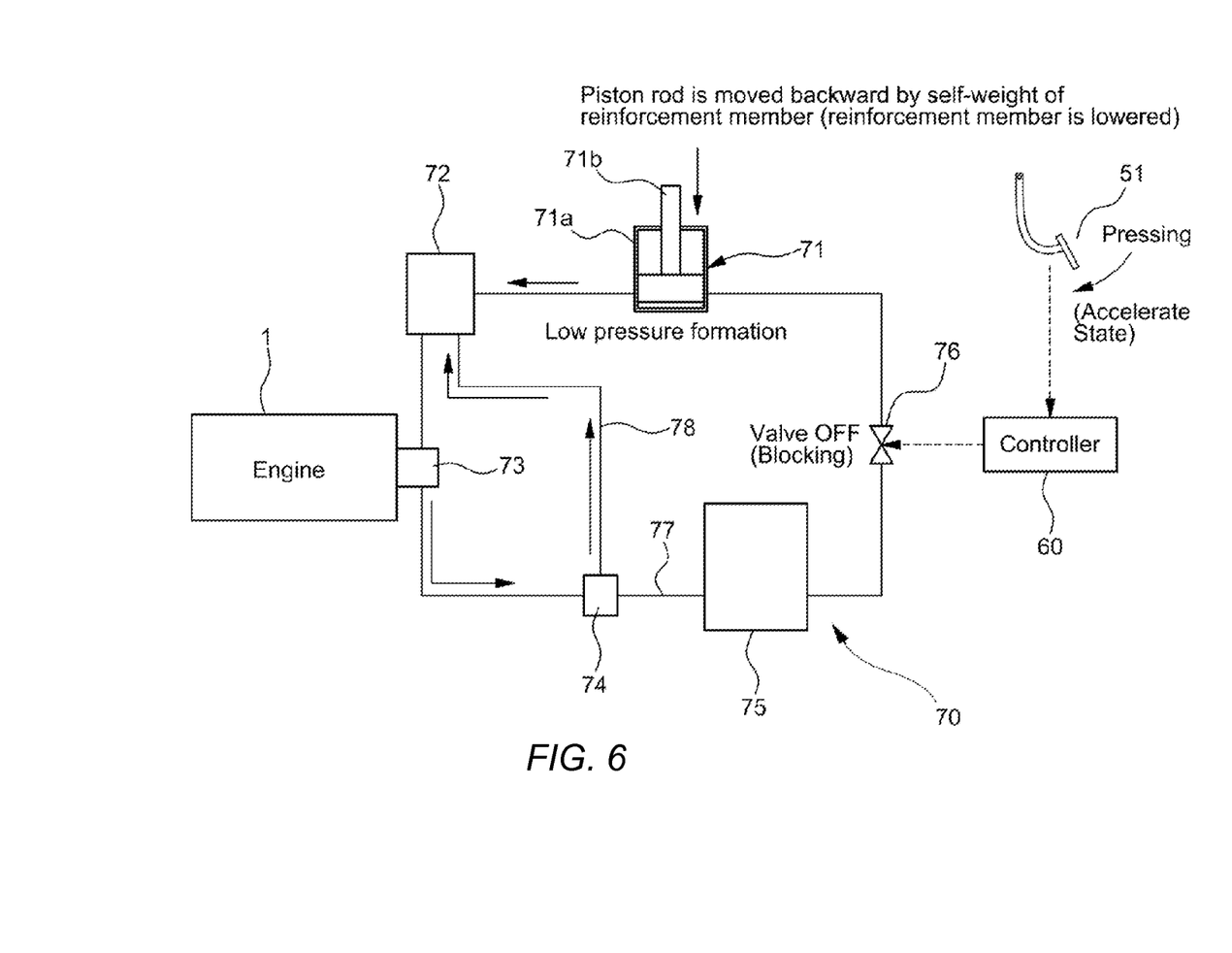
FIG. 6 shows an operation state of an exemplary driving apparatus during acceleration of a vehicle according to the present invention.
Figure 7:
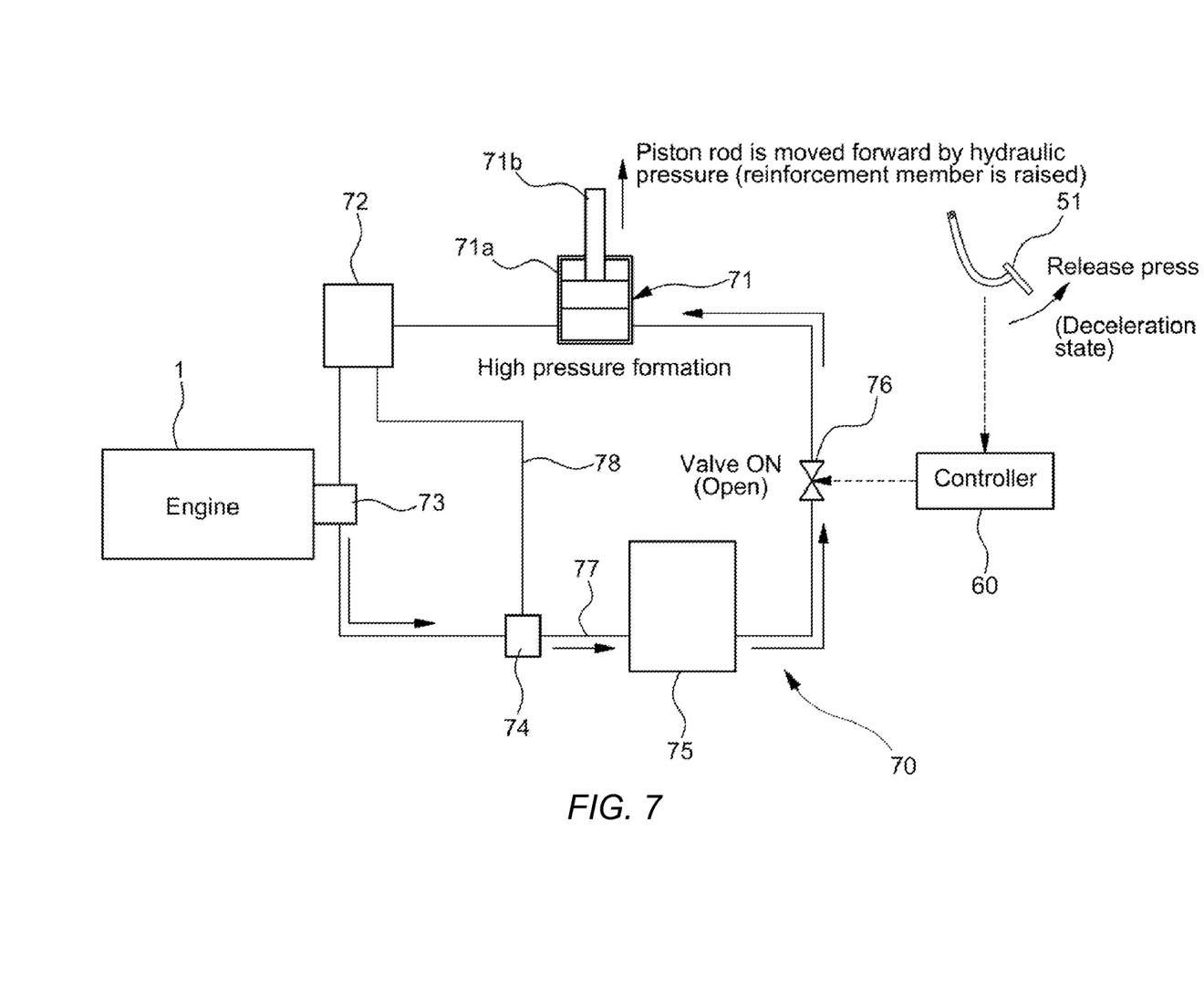
FIG. 7 shows an operation state of an exemplary driving apparatus during deceleration of a vehicle according to the present invention.

FIGS. 6 and 7 show a configuration and an operation state of a driving apparatus 70 according an embodiment of the present invention, and show an example of a configuration of the apparatus for driving a hydraulic cylinder mechanism 71. FIG. 6 shows the operation state during an acceleration of a vehicle, and FIG. 7 shows the operation state during a deceleration of a vehicle.

As shown in the drawings, the driving apparatus 70 includes the hydraulic cylinder mechanism 71 serving as an actuator for moving the reinforcement member upward or downward, a hydraulic pump 73 for forming an operation hydraulic pressure, and a hydraulic valve 76 for controlling the operation hydraulic pressure supplied to the cylinder mechanism 71.

As shown in the drawings, the hydraulic pump 73 is driven with the power transferred from the engine 1 to form the operation hydraulic pressure. The hydraulic valve 76 selectively supplies/blocks the operation hydraulic pressure formed by the hydraulic pump 73 to/from the cylinder mechanism 71 according to the control signal of the controller 60.

If the hydraulic valve 76 is opened according to the control signal of the controller 60 (Valve-On), the piston rod 71*b* moves forward while the operation hydraulic pressure generated by the hydraulic pump 73 is transferred to the cylinder mechanism 71. If the hydraulic valve 76 is closed according to the control signal of the controller 60 (Valve-Off), the operation hydraulic pressure operated to the cylinder mechanism 71 is blocked so that the piston rod 71*b* moves backward by gravity, e.g., the weight of the reinforcement member.

Since the operation hydraulic pressure does not operate the piston rod 71*b* when the hydraulic valve 76 is closed, the piston rod 71*b* connected to the reinforcement member moves backward while the reinforcement member is lowered by its own weight.

According to various embodiments, the operation hydraulic pressure generated by the hydraulic pump 73 is supplied to the cylinder mechanism 71 through a by-pass valve 74, a hydraulic tank 75 and the hydraulic valve 76. When a hydraulic pressure equal to or greater than a preset or predetermined pressure operates on the by-pass valve 74, the by-pass valve 74 blocks a hydraulic supply passage 77 connected to the hydraulic tank 75 and serves as a relief valve which allows a by-pass passage 78 connected to a reservoir tank 72 to be opened.

This configuration employs the hydraulic pump driven by the engine power. Since the operation state of the engine 1 is maintained and the state where the hydraulic pump 73 is driven by the transferred engine power is maintained while the vehicle is driving, the hydraulic oil pumped by the hydraulic pump 73 is returned to the reservoir tank 72 through the by-pass valve 74 and the by-pass passage 78 in the state where the hydraulic pressure is prohibited from being supplied to the cylinder mechanism 71 when the hydraulic valve 76 is closed.

In more detail, as shown in FIG. 7, if the hydraulic valve 76 is closed according to the control signal of the controller 60 when the vehicle decelerates, the operation hydraulic pressure generated by the hydraulic pump 73 is supplied to the cylinder mechanism 71 and the piston rod 71*b* of the cylinder mechanism 71 is raised due to the high-pressure formation, so that the reinforcement member is raised.

To the contrary, as shown in FIG. 6, the hydraulic valve 76 is closed according to the control signal of the controller 60 during the acceleration of a vehicle and the operation hydraulic pressure operating to the piston rod 71*b* of the cylinder mechanism 71 is released, so that the piston rod 71*b* moves backward by the reinforcement member which is being lowered due to its own weight.

In this case, the hydraulic oil pumped by the hydraulic pump 73 also is returned to the reservoir tank 72 in the state where the hydraulic oil discharged from the cylinder mechanism 71 is returned to the reservoir tank 72 and the hydraulic valve 76 is closed at the same time.

In the state where the hydraulic valve 76 is closed, since high pressure, which is equal to or greater than a preset or predetermined pressure, is applied to the by-pass valve 74, the by-pass valve 74 allows the by-pass passage 78 to be opened, so that the hydraulic oil pumped by the hydraulic pump 73 is returned to the reservoir tank 72 through the by-pass passage 78.

Hereinafter, the operation state of the present invention will be described below.

When the reinforcement member 30 is in a raised state, if a driver steps on the accelerator pedal 51, the controller 60 determines that the vehicle is in an accelerating state by identifying that the accelerator pedal 51 is operated (pressing operation) in the state where the vehicle speed exists based on the signals of the vehicle speed detection unit 40 and the accelerator pedal detection unit 50.

Thus, the controller 60 operates the driving apparatus 70 to allow the reinforcement member 30 to be lowered. In this case, as shown in FIG. 6, the hydraulic valve 76 is closed so that the hydraulic pressure to the cylinder mechanism 71 is blocked, so the reinforcement member 30 is lowered by its own weight. As a result, when the vehicle accelerates, the reinforcement member 30 is spaced apart from the cross member 20 (see FIG. 3), so that noise is generated due to the cross member 20, so a driver may feel a dynamic driving sound.

To the contrary, if a driver releases the accelerator pedal (pressure release) in the state where the reinforcement member 30 is lowered, the controller 60 identifies that the vehicle speed exists and the operation of the accelerator pedal 51 is released based on the signals from the vehicle speed detection unit 40 and the accelerator pedal detection unit 50 so that the controller 60 determines that the speed of the vehicle is reduced.

Thus, the controller 60 operates the driving device 70 to allow the reinforcement member 30 to be raised. Then, as shown in FIG. 7, the controller 60 opens the hydraulic valve 76 to supply the operation hydraulic pressure generated by the hydraulic pump 73 to the cylinder mechanism 71, so that the piston rod 71*b* of the cylinder mechanism 71 is moved forward to allow the reinforcement member 30 to be raised.

Thus, when the vehicle decelerates, a silent sound may be implemented since the pad 31 of the reinforcement member 30 is in contact with the cross member 20, which is different from the acceleration period.

For convenience in explanation and accurate definition in the appended claims, the terms "upper" or "lower", "forward" or "backward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for controlling noise of a vehicle body, the apparatus comprising:
   a reinforcement member movably installed in a vehicle body frame;
   an accelerator pedal detection unit for detecting whether an accelerator pedal is operated;

a controller for determining whether a vehicle accelerates or decelerates based on a signal from the accelerator pedal detection unit and outputting a control signal to move the reinforcement member to be in contact with or to be spaced apart from a cross member of the vehicle body frame in accord with acceleration or deceleration of the vehicle; and a driving apparatus for moving the reinforcement member according to the control signal of the controller, wherein a noise generated by the cross member is modified differently according to the acceleration or the deceleration of the vehicle by selective movement of the reinforcement member, thereby improving sound quality.

2. The apparatus of claim 1, further comprising:

a pad installed in the reinforcement member, wherein the reinforcement member is in contact with the cross member through the pad.

3. The apparatus of claim 1, wherein the controller outputs a control signal for allowing the reinforcement member to be in contact with the cross member when the vehicle decelerates, and outputs a control signal for allowing the reinforcement member to be spaced apart from the cross member when the vehicle accelerates.

4. The apparatus of claim 3, further comprising:

a vehicle speed detection unit for detecting a vehicle speed, wherein the controller outputs a control signal based on signals from the vehicle speed detection unit and the accelerator pedal detection unit, wherein the controller outputs the control signal for allowing the reinforcement member to be spaced apart from the cross member when the accelerator pedal is operated in a state where the vehicle is driven such that a vehicle speed exists, and outputs a control signal for allowing the reinforcement member to be in contact with the cross member when the accelerator pedal is released in a state where the vehicle is driven such that a vehicle speed exists.

5. The apparatus of claim 1, wherein the vehicle body frame includes side frames disposed at opposite sides of the vehicle body, wherein the cross member connects the side frames at the opposite sides of the vehicle body to support a transmission.

6. The apparatus of claim 5, wherein the reinforcement member is transversely disposed between the side frames at the opposite sides of the vehicle body under the cross member.

7. The apparatus of claim 5, wherein the driving apparatus includes an actuator for moving the reinforcement member according to the control signal of the controller, and opposite ends of the reinforcement member are supported in the vehicle body frame by the actuator.

8. The apparatus of claim 7, wherein the actuator is a cylinder mechanism which supports each end of the reinforcement member, and of which a cylinder body is fixed to a bracket mounted to the vehicle body frame and a piston rod moving forward and backward is hinge-coupled to each end of the reinforcement member so that the reinforcement member is moved as the piston rod moves forward or backward.

9. The apparatus of claim 8, wherein the cylinder mechanism is a hydraulic cylinder mechanism, and the driving apparatus further comprises a hydraulic pump driven by a transferred engine power to supply an operation hydraulic pressure to the hydraulic cylinder mechanism and a hydraulic valve for controlling the hydraulic pressure supplied to the hydraulic cylinder mechanism such that the reinforcement member is moved according to the control signal of the controller.

* * * * *